Figures 1, 2:
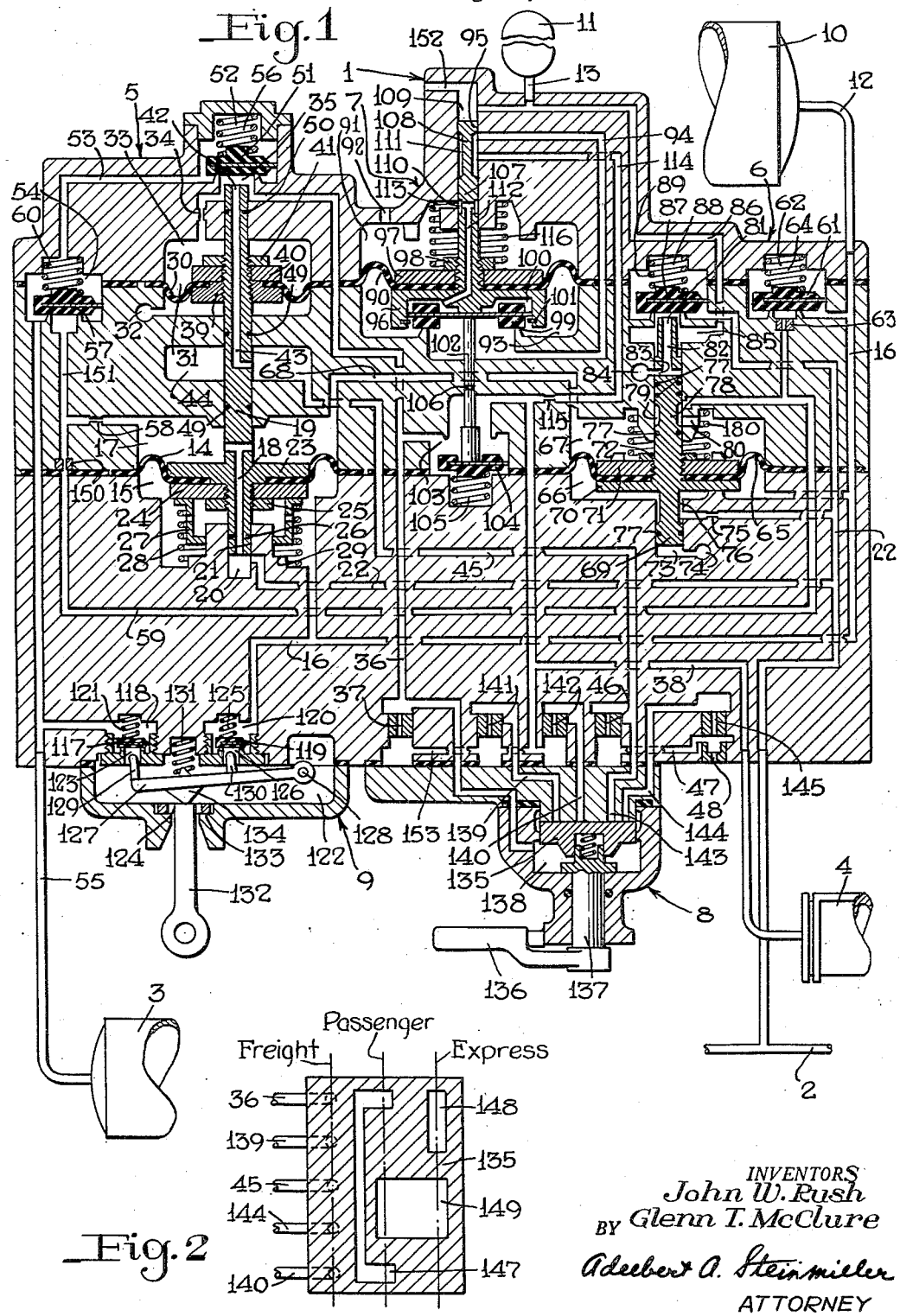

INVENTORS
John W. Rush
BY Glenn T. McClure
Adelbert A. Steinmiller
ATTORNEY

United States Patent Office 2,824,770
Patented Feb. 25, 1958

2,824,770

FLUID PRESSURE BRAKE EQUIPMENT

John W. Rush, Wilkinsburg, and Glenn T. McClure, McKeesport, Pa., assignors to Westinghouse Air Brake Company, Wilmerding, Pa., a corporation of Pennsylvania Application August 27, 1953, Serial No. 376,775

26 Claims. (Cl. 303—35)

This invention relates to fluid pressure brake equipment and more particularly to the railway type adapted to be controlled by variations in pressure in a brake pipe.

The brake controlling valve devices now in use in Europe are of the graduated release type and are not required to select between service and emergency rates of brake pipe reduction as in the United States of America. Moreover, perhaps fifty to sixty percent of the cars being operated in trains in Europe are provided with ineffective brakes or no brake equipment and it is customary to operate trains including such unbraked cars collected together, making it difficult to transmit a reduction in brake pipe pressure from one braked car to another through a train for applying brakes.

One object of the invention therefore, is the provision of an improved brake controlling valve device particularly adapted for use on European railway cars.

Another object of the invention is the provision of an improved graduated release type of brake controlling valve device for European service having quick service means for positively transmitting in a desired minimum of time a reduction in brake pipe pressure from one braked car to another throughout a train constituted as above described and for positively insuring operation of the respective brake controlling valve devices and which provides for maintenance of brake cylinder pressure against leakage.

Another object of the invention is to provide an improved brake controlling valve device of the above described type which is relatively small, light weight and cheap to manufacture.

Other objects and advantages will become apparent in the following more detailed description of the invention.

In the accompanying drawing:

Fig. 1 is a diagrammatic view, chiefly in section, of a fluid pressure brake equipment embodying the invention; and, Fig. 2 is a diagrammatic development view of a selector valve device shown in section in Fig. 1.

Description

As shown in Fig. 1, the brake equipment embodying the invention comprises a brake controlling valve device 1 adapted to operate in response to a reduction in pressure in a brake pipe 2 to control the supply of fluid under pressure from a supply reservoir 3 to a brake cylinder device 4 to apply brakes on a car and adapted to operate in response to charging of said brake pipe with fluid under pressure to charge the supply reservoir with fluid under pressure and at the same time to release fluid under pressure from said brake cylinder device.

The brake controlling valve device 1 comprises a casing which contains a brake control portion 5, a quick service valve device 6, a brake cylinder inshot valve device 7, a service selector valve device 8, and a reservoir release valve device 9, and to which a control reservoir 10 and quick service reservoir 11 are connected by way of pipes 12 and 13, respectively.

The brake control portion 5 comprises a diaphragm 14 clamped about its periphery between two sections of the casing and combining with said casing to define at one side a chamber 15, which is connected to the control reservoir 10 by way of a passage 16 and the pipe 12, and to define at the other side a chamber 17, which is connected by way of a passage 18, formed in a follower stem 19, to a chamber 20 at the lower end of a bore 21, in which the lower end of the stem is slidably guided. The chamber 20 is normally connected to brake pipe 2 through a passage 22 formed in the casing, which connection may be lapped off by the stem 19 upon the occurrence of an excess of fluid pressure in chamber 17.

The follower stem 19 has formed integral therewith in chamber 17 a follower plate 23 and extends downwardly therefrom, as viewed in the drawing, through a central opening in diaphragm 14 into chamber 15, where it makes screw-threaded connection with a follower plate 24 and a locking nut 25 for clamping the central portion of said diaphragm. The lower end of stem 19 is encircled by a sealing ring 26 for making sealing contact with a wall of the bore 21 so as to prevent leakage of fluid under pressure between chambers 15 and 20. The lower end of stem 19 is also encircled by a stop member 27 and a spring 28 contained in the chamber 15, the spring holding the stop member in contact with the follower plate 24 to define the normal position of diaphragm 14, and the stop member being adapted to limit downward movement of diaphragm 14 by contact with a shoulder 29 formed in the casing.

The brake control portion 5 further comprises a diaphragm 30 clamped about its periphery between two sections of the casing and combining with said casing to define at one side a chamber 31 which is open to atmosphere by way of a vent port 32 and at the other side a chamber 33 which is open through a choked passage 34 to a chamber 35 which is connected to the brake cylinder device 4 through a passage 36, a choke 37 and a connected passage and pipe 38. The diaphragm 30 is clamped at its center to the stem 19 by means of a screw-threaded follower plate 39 contained in chamber 31 at one side and a follower plate 40 and locking nut 41 contained in chamber 33 at the other side secured by screw-thread means to a portion of said stem which extends through a suitable central opening in said diaphragm.

As shown in the drawing, chamber 35 may also be connected to atmosphere through an opening 42 in the upper end of stem 19 for a longitudinal passage 43 therein leading to a chamber 44 formed in the casing intermediate chambers 17 and 33 and open to atmosphere through a passage 45, choke 46, passage 47 and vent port 48. The follower stem is provided at each side of chamber 44 with a sealing ring 49 for contact with the casing to prevent leakage of fluid under pressure between chamber 44 and the respective chambers 17 and 31. A similar sealing ring 50 is provided in a similar manner to prevent leakage of fluid under pressure between chambers 33 and 35.

The opening 42 to passage 43 may be closed upon upward movement of the stem 19, as hereinafter described, into contact with a check valve 51 contained in a chamber 52 which is connected to the supply reservoir 3 through a passage 53, a chamber 54 and passage and pipe 55. A spring 56 contained in chamber 52 constantly urges check valve 51 toward its seated position, in which it is shown in the drawing. Thus, upward movement of the stem 19 not only closes the atmospheric passage 42 but may also open the supply reservoir 3 to the brake cylinder 4, as will appear hereinafter more fully.

A check valve 57 is provided in the chamber 54 for controlling the charging of the supply reservoir 3 with fluid under pressure supplied from the brake pipe 2 by way of passage 22, chamber 20, passage 18 and chamber 17 in brake control portion 5, in part by way of a choke 58 and mainly through quick service valve device 6 to a passage 59 and is urged toward its seated position, in which it is shown, by a spring 60 contained in chamber 54.

A check valve 61 is provided in a chamber 62 for controlling the charging of the control reservoir 10 with fluid under pressure supplied from the brake pipe 2 by the brake control portion 5 to passage 59, as described above, thence through a choke 63 and past check valve 61 to chamber 62, whence it may flow through passage 16 and pipe 12 to control reservoir 10. Operatively mounted in chamber 62 is a spring 64 which constantly urges the valve 61 toward its seated position, in which it is shown in the drawing.

The quick service inshot valve device 6 comprises a flexible diaphragm 65 clamped about its periphery between two sections of the casing, with which it combines to define at one side a chamber 66 which is in constant, open communication with the control reservoir 10 by way of passage 16 and pipe 12, and at the other side a chamber 67 which is connected to chamber 17 in the brake control portion 5 by way of a passage 68. A follower stem 69 is provided in chamber 66 with an integral follower plate 70 and extends through a central opening in the diaphragm 65 to make screw-threaded connection with a follower plate 71 and locking nut 72 in chamber 67 by which the stem is secured to the diaphragm.

The lower end of the follower stem 69 is slidably mounted in a bore 73 which is open at one end to chamber 66, at the other end to atmosphere through a vent port 74, and at the side of a restricted passage 75 leading to the passage 22. The stem 69 is provided with an undercut, or reduced, portion 76 which serves to connect chamber 66 to passage 75 in one position of the stem, in which it is shown in the drawing, and may be moved out of register with passage 75 upon upward movement of the stem, as will be described later. The lower end of the bore is sealed off from the chamber 66 by means of a sealing ring 77 mounted in the usual manner on the stem below the reduced portion 76.

Intermediate its ends the follower stem 69 is provided with another reduced portion 78 which combines with the walls of the casing to provide a chamber 79 which, as shown in the drawing, may connect a passage 80, open to the chamber 67, to the passage 59 and thereby provides the principal charging communication for control reservoir 10 and supply reservoir 3. The stem 69 is provided with additional sealing rings 77 at either side of chamber 79 for the purpose of preventing leakage to, or from, said chamber. Operatively mounted in chamber 67 between a portion of the casing and follower plate 71 is a spring 180 which constantly urges the follower stem 69 downwardly into contact with the casing as shown in the drawing.

The upper end of the stem 69 is provided with an opening 81 for a longitudinal passage 82 which terminates at its other end in a cross port 83 which is adapted to register with an atmospheric vent port 84 when the stem is in the position in which it is shown in the drawing. The upper end of the stem projects into a chamber 85, which chamber is open to a passage 86 leading to the quick service reservoir 11 through pipe 13 and also leading to the brake cylinder inshot valve device 1. The opening 81 may be closed by sealing engagement of the upper end of the stem 69 with the seating face of a check valve 87 contained in a chamber 88, which is open to passage 22, and urged toward its seated position, closing communication from chamber 88 to chamber 85, by a spring 89, as shown in the drawing.

As will appear more fully later, upward movement of the stem 69 against the force of spring 180 upon a reduction in the pressure of fluid in chamber 67 will close off the connection of chamber 85 to atmosphere and connect brake pipe 2 to quick device reservoir 11 through passage 22, chamber 85, passage 86 and pipe 13. At the same time, chamber 79 is moved out of register with passage 80, thereby cutting off the main supply of fluid under pressure from brake pipe 2 to the control reservoir 10.

The brake cylinder inshot valve device 7 comprises a diaphragm 90 clamped about its periphery between two sections of the casing with which it combines to define at one side a chamber 91 which is open to atmosphere by way of a vent port 92 and at the other side a chamber 93 which may be connected to a passage 94 in the casing. The center of the diaphragm 90 is clamped to a follower stem 95 by means of an integral follower plate 96 contained in chamber 93 and a follower plate 97 and locking nut 98 contained in chamber 91 and secured to said stem by screw-thread means. A valve 99 is operably mounted in chamber 93 for controlling flow of fluid under pressure between passage 94 and chamber 93, the valve being disposed in a recess 100 formed in the follower plate 96 which has a snap ring 101 inserted in a suitable groove in the lateral wall of the recess adjacent its mouth so that the valve may be carried by the snap ring out of its seated position shown upon deflection of the diaphragm 90 in an upward direction. Engaging the lower, seated face of the valve 99 is a pusher stem 102 which extends through a suitable opening in the casing, in which it is slidably guided, into an inshot chamber 103 which is open to the passage 36. An inshot valve 104 is mounted in the chamber 103 for operation by the stem 102 against the force of a bias spring 105 which constantly urges said valve toward its seated position in which communication of passage 36 to the brake cylinder device 4 by way of passage 38, chamber 103, is closed. Leakage of fluid under pressure between passages 38 and 94 is prevented by a sealing ring 106 encircling the stem 102 and engaging the casing in the usual manner.

The follower stem 95 is further provided with two spaced-apart reduced portions 107, 108 within a bore 109 provided in the casing for slidably guiding said stem and forming within said bore a pair of chambers 110, 111, respectively. The chamber 110 is connected to chamber 93 by way of a longitudinal passage 112 formed in the stem 95 and may be connected to chamber 91 by way of a passage 113, as shown in Fig. 1. With stem 95 in the position in which it is shown in the drawing chamber 111 will be open to chamber 93 by way of passage 94 and will connect chamber 93 to chamber 103, open through a passage 114 and a choke 115 to brake cylinder passage 38. A control spring 116 is operatively mounted in chamber 91 between a portion of the casing and the follower plate 97 so as to normally hold the follower stem 95 in the position shown, in which position inshot valve 104 is held unseated by spring 116 acting through the medium of stem 102 and valve 99 is held seated by contact with the follower plate 96.

The reservoir release valve device 9 comprises a lift valve 117 operably mounted in a chamber 118 in the casing which is open to passage 55 leading to the supply reservoir 3, and a lift valve 119 operably mounted in a chamber 120 which is connected to control reservoir 10 through the passage 16. A spring 121 contained in chamber 118 yieldingly urges valve 117 to its seated position, closing communication to a chamber 122 by way of an opening 123, which chamber is connected to atmosphere by way of a plurality of openings 124 in a handle 132. Similarly, a spring 125 contained in chamber 120 yieldingly urges valve 119 to its seated position, thereby closing communication by way of an opening 126 to atmospheric chamber 122.

In chamber 122 a beam 127 is pivotally mounted at one end on a stud 128 anchored in the casing and is provided on one side with a pair of stems 129, 130 which are adapted to engage and unseat valves 117 and 119, respectively, upon rotation of said beam in a clockwise direction against the force of a spring 131 contained in chamber 122. Clockwise rotation of the beam 127 may be effected by the rocking of the handle 132 in any direction about its upper end which is in the form of a circular flange 133, seated in a suitable recess in the casing, which flange is urged toward the position in which it is shown by force of the spring 131 acting through the medium of the beam 127 and a boss 134 formed on the side opposite to the spring and bearing on the flange 133.

In the first stage of rocking movement of the handle 132 beam 127 will be rocked in a clockwise direction about the stud 128, unseating the valve 119, whereupon fluid under pressure in control reservoir 10 will be permitted to flow to atmosphere by way of pipe 12, passage 16, chamber 120, past valve 119, through chamber 122 and openings 124. The second stage constitutes further rocking of the handle 132 in the same direction which unseats valve 117, whereupon fluid under pressure in supply reservoir 3 flows to atmosphere through pipe and passage 55, chamber 122 and openings 124. When the pressure in the control reservoir 10, and thus in chamber 15, is reduced below that in chamber 17, the brakes will be released in the same manner and if a release of brakes had been effected by increasing the pressure in chamber 17 by supplying fluid under pressure thereto from the brake pipe 2.

The service selector valve device 8 is manually adjustable to provide for different rates of application and release of brakes on a car according to the type of service in which the car is to be operated, that is, freight service, passenger service or express service. To this end the selector valve device comprises a rotary valve 135 having three different positions, namely, freight, passenger and express as indicated by legends in Fig. 2, and is adapted to be turned to these different positions by a manually operable handle 136 connected to said valve through an operating stem 137. The rotary valve 135 is contained in a chamber 138 to which passage 36 is connected at all times. Connected to the seat of the rotary valve 135 are application passages 139, 140 which are also connected to the brake cylinder passage 38 through chokes 141 and 142, respectively, and release passages 45 and 144 are also connected respectively to said seat of the rotary valve and to atmosphere by way of choke 46, passage 47 and vent port 48.

With the selector valve device 8 in position for freight service the passages 139, 140, 45 and 144 are all lapped by the rotary valve 135, whereby the rate of brake application will be controlled solely by choke 37 and the rate of brake release will be controlled solely by choke 46. In passenger position of the rotary valve 135, a cavity 147 therein opens a communication between passages 36 and 140, whereby choke 142 is connected in parallel with the freight application choke 37, the combined capacities of the two chokes being effective to control the rate of brake application in passenger service. With the selector valve device 8 in position for express service a cavity 148 in the rotary valve 135 connects passage 36 with passage 139, whereby choke 141 is connected in parallel with the freight application choke 37 to control the rate of brake application for express service. In either position for passenger or express service a cavity 149 in the rotary valve 135 connects passages 45 and 144 whereby a choke 145 is connected in parallel with the freight release choke 46 to regulate the rate of brake release in passenger and express services.

*Operation*

With the brake equipment devoid of fluid under pressure all parts will assume the position in which they are shown in the drawing, except the manually adjustable service selector valve device 8, which for the time being will be assumed to be in freight position, as shown in the drawing.

*Initial charging of the brake equipment*

To initially charge the brake equipment on a train, as well as in recharging the brake equipment to effect a release of brakes after a brake application, it is customary to move the usual brake valve device (not shown) first to a release position for supplying fluid at relatively high pressure directly from the usual main reservoir on a locomotive to the brake pipe 2 at the locomotive, and then after a lapse of a period of time, which varies according to different conditions, the brake valve device will be moved to running position to reduce the pressure of further supply of fluid to said brake pipe to the normal degree at which it is desired to maintain it. The pressure in the brake pipe 2 on perhaps the first 15 cars of a train will therefore be initially increased to a degree in excess of the degree normally carried, the degree of such overcharge in the brake pipe being greatest on the car coupled to the locomotive and decreasing from car to car back through the train from the locomotive, and the above-mentioned time which the brake valve device is allowed to remain in release position is intended to be so limited as to prevent overcharging of the brake equipment on the cars on which the brake pipe is momentarily overcharged.

When fluid under pressure is supplied to the brake pipe 2, as above-described, such fluid will be supplied to passage 22 and thence to diaphragm chamber 17 in the brake control portion 5 by way of chamber 20 and the passage 18. Fluid under pressure supplied to chamber 17 in the brake control portion 5 will flow mainly by way of passage 68 to chamber 67 in the quick service valve device 6, whence it may flow by way of passage 80, chamber 79, passage 59, choke 63, past check valve 61, and through pipe 12 to control reservoir 10. Fluid under pressure thus supplied from the quick service valve device 6 to passage 59 may also flow through a restricted passage 150 to a passage 151, and thence past check valve 57 into chamber 54 and through passage and pipe 55 to supply reservoir 3. From chamber 17 such fluid will also flow through a restricted passage 58 to passage 151, whence it will flow past check valve 57 into chamber 54 and thence by way of connected passage and pipe 55 to supply reservoir 3. The choke 58 is a relatively more restricted passage than choked passage 150, so that the principal charging of the supply reservoir 3 is by way of passage 150 and the supplementary charging is by way of choke 58. The choke 75 is a simmering or stabilizing choke for permitting flow of fluid under pressure at a restricted rate in either direction between the brake pipe 2 and the control reservoir 10 and to dissipate overcharge pressure from said reservoir and prevent undesired application of the brakes occurring as a result of minor fluctuations of brake pipe pressure produced by erratic action in charging.

Upon instituting initial charging of the brake pipe 2, the higher than normal brake pipe pressure obtained on cars adjacent the locomotive will start to rush from chamber 20 through passage 18 into chamber 17 and thereby increase the pressure therein so rapidly as to create a force on diaphragm 14 which will move the follower stem 19 downwardly from the position in which it is shown in the drawing against the pressure of spring 28 in order to prevent overcharging of the supply reservoir 3 and the control reservoir 10, as will be described in detail later.

As the diaphragm 14 thus moves downwardly, the follower stem 19 will tend to block off the opening of passage 22 to chamber 20 and on cars near the locomotive the passage 22 will actually be cut off from chamber 20. The fluid under pressure thus supplied to chamber 17 however will be promptly dissipated through the charging choke 58 to the supply reservoir 3 and through passage 68, chamber 67, passage 80, chamber 79 in the quick service valve device 8, passage 59 and charging choke 63, past check valve 61 to passage 16 and thence to the control reservoir 10 and diaphragm chamber 15. By this action the pressures in chambers 17 and 15 at opposite sides of diaphragm 14 will tend to equalize, as the result of which spring 28 will gradually return the diaphragm and follower stem 19 to the normal charging position shown in the drawing in which position charging continues, as described above, until the equipment is charged with fluid under pressure at a normal pressure.

With the brake control portion 5 in release position and selector valve device 8 positioned for freight operation, as shown in the drawing, the brake cylinder device 4 will be open to atmosphere by way of passage 38, choke 37, passage 36, chamber 35 in control portion 5, passage 43 in follower stem 19, chamber 44, passage 45, choke 46, passage 47 and vent port 48, due to which brakes on the vehicle will be released.

*Effecting application of brakes*

When it is desired to effect an application of brakes, a reduction in pressure in the brake pipe 2 will be initiated by the engineer's brake valve device on the locomotive, in the well-known manner. When the brake pipe pressure is reduced as just mentioned, check valve 57 in the brake control portion 5 will prevent back-flow of fluid under pressure from the supply reservoir 3 and check valve 61 will prevent back-flow of fluid under pressure from control reservoir 10 to the brake pipe, although there will be a momentary slight trickle back from the control reservoir 10 through the choke 75, which however is of no consequence during the operation under consideration. As a result, the pressure in the brake pipe 2 on the first car of a train will promptly reduce substantially with that on the locomotive and when reduced, for example 0.4 pound, such reduction will be effective in chamber 17 of the brake control portion 5 and thereby in diaphragm chamber 67 in the quick service valve device 6, relative to the pressure of fluid in the control reservoir 10 acting in chamber 66, whereby a sufficient differential in pressures on opposite sides of diaphragm 65 will be established to deflect said diaphragm against spring 180 and move the follower stem 69 to a quick service position defined by contact between the locking nut 72 and the casing.

In quick service position of the follower stem 69 chamber 79 will be out of register with passage 80, which passage will then be disconnected from passage 59; crossport 83 will be out of register with vent port 84; opening 81 will be closed by contact with check valve 87 and check valve 87 will be actuated against spring 89 to its unseated position, whereupon brake pipe pressure in chamber 88 will equalize by way of chamber 85, passage 86 and pipe 13 into the quick service volume reservoir 11 and flow to atmosphere by way of bore 109 and a vent port 152 in the inshot valve device 7. As will appear more fully later, this venting of brake pipe to atmosphere will continue until the inshot valve device 7 is operated in response to pressure of fluid being supplied to the brake cylinder device 4 by operation of the brake control portion 5 in response to the reduction in brake pipe pressure.

It will now be seen that in response to a very slight reduction in pressure in brake pipe 2, the quick service valve device 6 will operate to open said brake pipe to atmosphere for effecting a fast local venting of fluid under pressure from said brake pipe. The reduction of brake pipe pressure thus effected will hasten the reduction of pressure in the brake pipe on to the next operating brake-equipped car of a train where the next quick service valve device 6 will operate, as just described, to open a local vent from the brake pipe to hasten the slight reduction to the next operating brake-equipped car of a train and thus serially from one operating brake equipment to another through the train, the reduction will be transmitted even though at intervals in the train one or more non-brake-equipped car, or cars with non-operating brake equipment, may be bunched.

It is further desired to note that since in Europe brake controlling valve devices do not have to distinguish between different service and emergency rates in reduction of brake pipe pressure, as in the United States, the quick service reduction in brake pipe pressure effected by operation of the quick service valve device 6 may be as rapid as desired, which in conjunction with the very low differential in fluid pressures required to operate said quick service valve device permits any desired rate of serial operation of the quick service valve devices in a train.

When the pressure of fluid in the brake pipe is reduced by operation of the quick service valve device 6, as just described, a corresponding reduction in pressure will occur in chamber 17 of the brake control portion 5, and when the pressure in said chamber thus becomes sufficiently reduced, the control reservoir pressure in chamber 15 will become effective to deflect the diaphragm 14 upwardly against the reduced brake pipe pressure until the follower stem 19 engages valve 51 and then against the additional pressure of spring 56 in chamber 52 to a brake application position defined by contact of locking nut 41 in chamber 33, with the casing.

It is intended that the diaphragm 14 deflect upwardly, as just described, when brake pipe pressure in chamber 17 is reduced, for example, two or three pounds, below control reservoir pressure in chamber 15. However if the diaphragm does not move upwardly upon such a reduction in brake pipe pressure, then by operation of the quick service valve device 6 the pressure in the brake pipe 2 and chamber 17 will continue to be reduced relative to control reservoir pressure in chamber 15 until a sufficient differential between such opposing pressures on the diaphragm is obtained to insure such movement. It will thus be evident that the positive, local quick service venting of fluid under pressure from the brake pipe by operation of the quick service valve device 6 will insure movement of the diaphragm 14 on a brake-equipped car even if located in a train to the rear of a bunch of two or more non-brake-equipped car, or cars provided with brake equipment which is not operating. When the diaphragm 14 thus moves in response to a reduction in brake pipe pressure in chamber 17, the follower stem 19 and attached diaphragm 30 will move therewith until said stem engages the seating surface of valve 51, by which action communication will be closed between the brake cylinder passage 36 and release passage 45. Then when the differential in opposing pressures acting on the diaphragm 14 is further reduced sufficiently to overcome the bias pressure of spring 56, the valve 51 will be unseated, thereby connecting chamber 52, open through passage 53, chamber 54 and passage and pipe 55 to supply reservoir 3, to chamber 35 connected to brake cylinder device 4 by way of passage 36 which is connected to brake cylinder pipe 38 by way of chamber 103 and by way of a parallel communication through choke 37 and a passage 153 with the selector valve device 8 in freight position, as shown in the drawing, whereupon fluid under pressure from the supply reservoir 3 will flow to the brake cylinder device 4 to effect an application of brakes.

Fluid under pressure thus supplied to brake cylinder passage 38 will also flow through choke 115 and passage 114, to chamber 111 in the inshot valve device 7, whence it will flow through passage 94 to the seated area of valve 99, which is held seated by the pressure of spring 116 acting on the follower plate 97 and connected follower stem 95. The flow capacity of choke 115 is so related to the brake cylinder communication that the rate of build-up of fluid pressure in passage 94 acting on valve 99 corresponds to the rate at which fluid pressure is established in the brake cylinder device 4. When the pressure in passage 94, and concurrently in brake cylinder device 4, is thus increased to a degree, such as ten pounds, said pressure acting on the under side of valve 99 will overcome the opposing pressure of spring 116 and thereby unseat said valve, permitting fluid under pressure in passage 94 to flow to chamber 93 and act on diaphragm 90 in an upwardly direction. Since the effective area of the diaphragm 90 is much greater than the valve 99, the unseating of said valve will provide a force so in excess of the opposing force of spring 116 that the diaphragm and follower stem 95 will snap to its uppermost position in which atmospheric passage 112 open to chamber 93 will be closed and chamber 111 will connect chamber 93 via passage 94 to the quick service passage 86. This upward movement of follower stem 95 will permit spring 105 to seat the check valve 104, whereupon further supply of fluid under pressure to the brake cylinder device 4 will be limited to the flow capacity of choke 37.

As fluid under pressure is supplied to the brake cylinder device 4 as just described such pressure will also flow through choke 34 to become effective in diaphragm chamber 33 where it will act in opposition to control reservoir pressure in chamber 15 acting on diaphragm 14 plus the pressure of spring 28. Assuming that the reduction in brake pipe pressure effected by operation of the engineer's brake valve is limited to some chosen degree, then when the pressure obtained in the brake cylinder device 4 and in chamber 33 is increased to a chosen relation to the degree of brake pipe reduction in chamber 17, the brake cylinder pressure acting in chamber 33 will move the diaphragms 30 and 14 connected by the follower stem 19 downwardly to an application lap position, in which position check valve 51 will again be seated but opening 42 in the end of follower stem 19 will not be uncovered to prevent further supply of fluid under pressure to said chamber and the brake cylinder device thereby limiting the pressure in said brake cylinder device in accordance with the degree in reduction of brake pipe pressure. The application lap position of the follower stem 19 is thus defined by the engagement of the check valve 51 with its seat which will limit the effectiveness of the spring 56.

If the engineman desires to increase the degree of brake application he will effect a further reduction in pressure in brake pipe 2 according to the desired increase in brake application. In response to the consequent reduction in pressure in chamber 17 the diaphragm 14, and connected diaphragm 30, will move upwardly to actuate the diaphragm follower stem 19 to unseat the check valve 51, whereupon fluid under pressure will again be supplied to the brake cylinder device 4 and chamber 33, and when the pressure in said brake cylinder device and chamber becomes thus increased in proportion to the degree of reduction in brake pipe pressure, the diaphragm assemblage will again move the follower stem 19 to application lap position to seat valve 51 and thereby cut off further supply of fluid under pressure to the brake cylinder device and to chamber 33. By thus reducing the brake pipe pressure in such steps as desired, proportional increases in pressure may be provided in the brake cylinder device 4 to provide any selected degree of braking, or if desired, the brake pipe reduction may be made in a single stage resulting in a corresponding buildup in degree of brake application. The pressure of fluid in the supply reservoir 3 will exceed that in the brake cylinder device when what may be considered a full application of brake is effected, but if what may be called an over-reduction in brake pipe pressure is effected, or the brake pipe pressure is completely released to atmosphere, the pressure of fluid in the supply reservoir 3 will equalize into the brake cylinder device 4 and chamber 33, but since diaphragm 30 is smaller than diaphragm 14, this will occur without producing sufficient force on diaphragm 30 to move the diaphragm assemblage and follower stem 19 out of a position in which the check valve 51 will remain unseated.

From the above description it will now be clear that an application of brakes may be graduated on in any desired steps or may be made in a continuous step if desired. It will also be noted that closing of valve 104 in the inshot valve device 7 will reduce the rate of brake application to the flow capacity of choke 37. The inshot valve 104 closes at a pressure in the brake cylinder device 4 which is just sufficient to displace the brake cylinder piston to its application position but not sufficient to produce effective braking, in order to prevent damaging running-in of slack in a train. Through the use of the inshot valve device 7, therefore, provision is made for prompt displacement of the brake cylinder piston to brake applying position so as not to materially delay obtaining an effective application of the brakes by the subsequent supply of fluid under pressure only through choke 37 which then governs the rate of effective brake application and will provide a sufficiently uniform rate of brake application throughout a train to decelerate it or to bring it to a stop without objectionable shock.

While an application of brakes at a degree proportional to the degree of brake reduction is in effect with the brake control portion 5 in application lap position, if there should be leakage of fluid under pressure from the brake cylinder device 4, the resulting reduction in pressure therein will create a like reduction in pressure in diaphragm chamber 33 and thereby in the force opposing control reservoir pressure in chamber 15 and when such reduction becomes sufficient, the latter pressure will gradually move the diaphragm assemblage upward. The follower stem 19 moving with the diaphragm assemblage will finally start to unseat the valve 51 and permit fluid under pressure to flow from the supply reservoir 3 to the brake cylinder device 4 and diaphragm chamber 33. The check valve 51 will thus be gradually opened until the rate of supply of fluid under pressure to the brake cylinder device and diaphragm chamber 33 becomes sufficient to offset the leakage of fluid under pressure therefrom and prevent further reduction in pressure in diaphragm chamber 33, whereupon movement of the diaphragm assemblage will cease in a position where the pressure of fluid in the brake cylinder device will be maintained against further drop.

If a brake application is in effect for a sufficient period of time and leakage from the brake cylinder device 4 is such that the pressure of fluid in the supply reservoir 3 becomes reduced to that in the brake cylinder device which would prevent further maintenance from the supply reservoir 3, but, further maintenance is desired, the communication which includes the choke 58 connecting the chamber 17 to the supply reservoir passage 151 is provided through which fluid under pressure in the brake cylinder device 4 may be maintained from the brake pipe 2 by flow from the diaphragm chamber 17 through choke 58, passage 151, past check valve 57 and through chamber 54 to the supply reservoir passage 53 and thence to the brake cylinder device 4. The flow capacity of choke 58 will be limited according to permissible leakage from the brake cylinder device and therefore be so small as not to create a bleed from the brake pipe in case of greater brake cylinder leakage which would prevent prompt response of the respective brake controlling valve device and brake controlling valve devices on other cars of a train to a change in brake pipe pressure initiated by the engineer. It will be noted that the choke 58 is in parallel with the normal charging communication by way of quick service valve device 6 and therefore will be effective with the latter for charging of supply reservoir 3 initially as above described as well as after an application of brakes, as will be subsequently described, but such effect will be substantially negligible due to the relatively small flow capacity of said choke.

Release of brake application

In order to effect release of a brake application and to recharge the brake equipment with fluid under pressure, fluid under pressure will be supplied to the brake pipe 2 and thence to chamber 20, whence it will flow by way of passage 18 in the follower stem 19 to chamber 17. When the pressure of fluid in chamber 17 is thus increased sufficiently, it, acting on one side of diaphragm 14, and brake cylinder pressure in chamber 33 acting on diaphragm 30 will create a force on the diaphragm assemblage which will exceed the opposing force created by control reservoir pressure in chamber 15 acting on the opposite side of diaphragm 14 and move the diaphragm assemblage downward. If the diaphragm assemblage happens to be in application position, the initial movement thereof will shift the follower stem 19 to application lap position, otherwise all movement will start from said lap position as soon as a sufficient differential in opposing forces is obtained to move the follower stem 19 downwardly, to thereby uncover the opening 42 in the upper end of said stem. With opening 42 uncovered fluid under pressure in brake cylinder device 4 will flow to atmosphere by way of passages 38 and 153, choke 37, passages 36 to chamber 35 in brake control portion 5, whence it will flow through opening 42, passage 43 to chamber 44, and thence through passage 45, choke 46, passage 47 and vent port 48.

As previously described in connection with initial charging of the brake equipment, the pressure of fluid in the brake pipe 2 will be increased more rapidly on cars adjacent the locomotive than on cars further back in the train. Consequently, if a car is close to the locomotive and the pressure of fluid in chamber 17 becomes increased sufficiently against the drain thereof to the supply reservoir 3 to create, along with the aid of brake cylinder pressure in chamber 33 acting on diaphragm 30, a downwardly acting force which will overcome the force of spring 28 and control reservoir pressure acting on diaphragm 14, the diaphragm assemblage will be moved downwardly to permit closing off of passage 22 and consequent restricting of flow of fluid under pressure to chamber 17 so as to balance the rate of increase therein against the force of fluid pressure in chamber 15 acting on diaphragm 14, and thereby restricting the recharge of the supply reservoir 3. The passage 22 may even be closed off completely near the front end of the train, whereupon pressure in chamber 17 will be substantially unchanged while the diaphragm assemblage will be gradually moved upward by control reservoir pressure in chamber 15 as the opposing brake cylinder pressure in chamber 33 gradually decreases. Even when overcharge of the brake pipe at the locomotive is terminated, if the pressure obtained in chamber 17 against the drain therefrom to the supply reservoir 3 provides a force which can overcome the opposing fluid pressure in chamber 15, the diaphragm assemblage will move downward to permit such closing of passage 22 as will be necessary to limit the rate of increase in pressure in chamber 17 according to the relatively slow rate at which the supply reservoir pressure can be restored by way of choke 58.

The effect of closing to a greater or less degree of the passage 22 in restoring the pressure of fluid in supply reservoir 3 at the head end of the train is therefore such as to limit the drawing off of fluid under pressure from the brake pipe so as to hasten flow of fluid under pressure to the rear of the train for causing operation of the brake controlling valve devices at the rear of the train to their brake release position for also recharging the supply reservoir 3 there.

As fluid under pressure is thus released from the brake cylinder device 4, the pressure of fluid in chamber 33 will reduce correspondingly and in case the restoration of brake pipe pressure in chamber 17 is limited to some chosen degree, brake cylinder pressure will continue to reduce until its effect in chamber 33 on diaphragm 30 is so reduced with respect to the increase in brake pipe pressure in chamber 17 that control reservoir pressure in chamber 15 acting on diaphragm 14 will move the diaphragm assemblage and follower stem 19 upwardly to a release lap position defined by contact with the valve 51. In the release lap position of the follower stem 19 communication will be closed between the brake cylinder device 4 and release passage 45 to thereby limit the reduction in pressure in said brake cylinder device in accordance with the increase in pressure in the brake pipe 2.

In the manner just described, the pressure of fluid in the brake cylinder device 4 may be graduated off in such steps as desired by proper step increases in pressure in the brake pipe 2 or in case the increase in pressure in brake pipe 2 is continuous, a corresponding continuous venting of fluid under pressure from the brake cylinder device will occur. When the pressure in the brake pipe 2 and thereby in diaphragm chamber 17 finally becomes increased to within two or three pounds of the normal pressure carried in the brake pipe, which pressure is effective in control reservoir 10 and acting in chamber 15 on diaphragm 14 in opposition to brake pipe pressure in chamber 17, the diaphragm assemblage will be held in its release position shown in the drawing as the pressure in brake cylinder device 4 and diaphragm chamber 33 finally reduces to atmospheric pressure and a complete recharging of supply reservoir 3 to the pressure in the brake pipe will occur.

Fluid under pressure supplied to chamber 17 will flow through passage 68 to chamber 67 in the quick service valve device 6. When the resulting increase in pressure in chamber 67 substantially eliminates the differential in fluid pressure acting on diaphragm 65, spring 180 will deflect said diaphragm downwardly, carrying the follower stem 69 downwardly out of contact with check valve 87 and thereby uncovering opening 81 and permitting fluid under pressure in quick service reservoir 11 and connected chamber 93 to flow through pipe 13, passage 86 to chamber 85, and thence to atmosphere by way of passage 82 and vent port 83. When the pressure of fluid in chamber 93 becomes reduced to a substantially ineffective degree, such as 3.5 pounds, the pressure of spring 116 in the inshot valve device 7 will move diaphragm follower stem 95 and stem 106 downwardly, unseating valve 104 which will connect passage 36 to passage 38 and seating valve 99 which will cut off passage 94 from chamber 93, and passage 112, which is now open to atmospheric port 92 as shown in the drawing. At the same time, chamber 111 will shift downwardly in bore 109, thereby disconnecting quick service venting passage 86 from passage 94 and connecting passage 86 to atmosphere through port 109 and vent port 152, venting quick service reservoir 11 through connecting pipe 13. Chamber 111 will at the same time connect passage 94 to passage 114 which is connected through choke 115 to brake cylinder passage 38 which in turn is connected to atmosphere by control valve device 5 as previously described.

It will be noted that fluid under pressure will not be released from the quick service reservoir 11 until brake pipe pressure is substantially equal to control reservoir pressure. This holding of fluid under pressure in the quick service reservoir 11 until brake pipe pressure is substantially restored will therefore prevent undesirably initiating a quick service reduction in brake pipe pressure and obtaining consequent shock producing increase in brake application, if while releasing, the operator desires to reapply the brakes to a greater degree and therefore reduces brake pipe pressure and causes operation of the quick service valve device 6 to its quick service position. The quick service reservoir 11 being still charged with fluid under pressure, quick service venting of fluid under pressure from the brake pipe will not therefore occur.

In the lower position of quick service diaphragm 65 and follower stem 69 fluid under pressure supplied to chamber 67 from the brake control portion 5 will flow through passage 80, chamber 79, passage 59, past charging check valve 57 into chamber 54, and thence through passage and pipe 55 to the supply reservoir 3 in the same manner as in initial charging of the equipment. Fluid under pressure thus supplied to charging passage 59 may also flow through choke 63, past charging check valve 61 to chamber 62, and thence through passage 16 and pipe 12 to control reservoir 10. Also, brake pipe passage 22 will now be connected to passage 16 and control reservoir 10 through choke 75, past reduced portion 76 to chamber 66 which is always open to passage 16 and to control reservoir 10 by way of pipe 12.

As will be readily apparent from previous description, if a car provided with this brake equipment is to be operated in passenger service, the service selector valve device 8 will be turned to passenger position in which the communication including choke 142 will be opened so that after operation of the inshot valve device in response to a chosen pressure in the brake cylinder device 4, fluid under pressure will be supplied to the brake cylinder device at a rate equal to the combined flow capacity of chokes 37 and 142, to provide the desired passenger rate of brake application for this service, whereas in freight service choke 37 alone is effective. In case the car is to be operated in express service, the service selector valve device 8 will be turned to express position where the communication including choke 141 will be connected in parallel with that containing choke 37 to provide the desired rate of brake application for this type of service. In both passenger and express positions of the service selector valve device 8, passages 45 and 144 will be connected, establishing the communication including choke 145 in parallel with the freight brake release communication including choke 46, in order to provide for the more rapid rate of brake release in these types of service than desired in freight service where choke 46 alone is effective. The combined brake releasing capacities of chokes 145 and 46 may exceed that of the freight application choke 37 and in order to be effective to control the rate of brake release in passenger and express service, the check valve 104 in the inshot valve 7 will be blown from its seat by brake cylinder pressure in passage 38, upon release of fluid under pressure from chamber 103, to open the communication by-passing the choke 37.

Regardless of the position of the service selector valve device 8, the operation of the brake equipment otherwise in response to a reduction and an increase in brake pipe 2 is the same as above described.

Summary

It will now be seen that I have provided a brake controlling valve device of the graduated release type which uses a control reservoir as a standard for gauging the degree of brake application according to the brake pipe reduction, which will also provide for as uniform application of brakes as possible throughout a train with a minimum time interval between the start of an application at the front and rear of the train and also a minimum time interval on each car between the initiation of reduction in brake pipe pressure and obtaining effective braking; which will also provide for maintenance from supply reservoir 3 of brake cylinder pressure against normal leakage and from brake pipe 2 after equalization of pressures in the supply reservoir and brake cylinder device; and which also provides for substantially uniform recharging of brake equipments and release of brakes throughout a train. Moreover the brake equipment is particularly adapted for use in trains where a number of cars may not be brake equipped, or equipped with brakes which are cut out, the equipment insuring obtaining the above results even in such trains.

Having now described our invention, what we claim as new and desire to secure by Letters Patent is:

1. In a fluid pressure brake apparatus, in combination, a brake pipe, a brake cylinder device, a supply reservoir, a control reservoir, a brake controlling valve device controlled by pressure of fluid in said brake pipe and opposing control reservoir pressure and operative upon a chosen reduction in brake pipe pressure relative to said opposing control reservoir pressure to supply fluid under pressure from said supply reservoir to said brake cylinder device, a quick service valve device controlled by brake pipe pressure and opposing control reservoir pressure and operative in response to a certain degree of reduction in brake pipe pressure less than said chosen reduction to establish a communication for effecting a quick service reduction in pressure in said brake pipe, a casing having a charging communication for conducting fluid under pressure supplied from said brake pipe to both of said reservoirs, one check valve for preventing flow of fluid under pressure from said supply reservoir to said charging communication, another check valve for preventing flow of fluid under pressure from said control reservoir to said charging communication, and valve means operated by said quick service valve device to open said charging communication when the brake pipe pressure is substantially equal to said opposing control reservoir pressure and to close said charging communication in response to said certain degree of reduction in brake pipe pressure.

2. In a fluid pressure brake apparatus, in combination, a brake pipe, a brake cylinder device, a supply reservoir, a control reservoir, a brake controlling valve device controlled by pressure of fluid in said brake pipe and opposing control reservoir pressure and operative upon a chosen reduction in brake pipe pressure relative to said opposing control reservoir pressure to supply fluid under pressure from said supply reservoir to said brake cylinder device, a quick service valve device controlled by brake pipe pressure and opposing control reservoir pressure operative in response to a certain reduction less than said chosen reduction in brake pipe pressure to establish a communication for effecting a quick service reduction in pressure in said brake pipe, charging communication means for conducting fluid under pressure supplied from said brake pipe by said brake controlling valve device to both of said reservoirs, one check valve for preventing flow of fluid under pressure from said supply reservoir to said charging communication means, another check valve for preventing flow of fluid under pressure from said control reservoir to said charging communication means, valve means operative by said quick service valve device to open said charging communication when said certain reduction is partially restored, and choke means constantly connecting said fluid under pressure supplied from said brake pipe by said brake controlling valve device to said charging communication means in by-passing relation to said valve means.

3. In a fluid pressure brake apparatus, in combination, a brake pipe, a brake cylinder device, a supply reservoir, a brake controlling valve device controlled by pressure of fluid in said brake pipe and an opposing pressure and operative upon a chosen reduction in brake pipe pressure relative to said opposing pressure to supply fluid under pressure from said supply reservoir to said brake cylinder device, a quick service reservoir, a quick service valve device controlled by brake pipe pressure and an opposing pressure and operative in response to a reduction in brake pipe pressure less than said chosen reduction to connect said brake pipe to said quick service reservoir, an inshot valve device controlling a fluid pressure supply communication from said brake controlling valve device to said brake cylinder device having one position in which said communication is open and operative in response to a certain degree of pressure in said brake cylinder device to another position to close said communication, and a constantly open, relatively restricted communication in by-passing relation to said inshot valve device, said inshot valve device being operative in response to a reduction in pressure of fluid in said quick service reservoir to less than said certain degree to said one position to establish a direct connection from said quick service reservoir to atmosphere and in said other position to close said connection.

4. In a fluid pressure brake apparatus, in combination, a brake pipe, a brake cylinder device, a supply reservoir, a control reservoir, a brake controlling valve device controlled by pressure of fluid in said brake pipe and an opposing control reservoir pressure and operative upon a chosen reduction in brake pipe pressure relative to said opposing pressure to supply fluid under pressure from said supply reservoir to said brake cylinder device, a quick service reservoir, a quick service valve device controlled by brake pipe pressure and said opposing control reservoir pressure having a normal position in which said quick service reservoir is connected to atmosphere and operative in response to a reduction in brake pipe pressure less than said chosen reduction to a quick service position in which said brake pipe is connected to said quick service reservoir, and an inshot valve device having one position in which said quick service reservoir is connected to atmosphere and said brake cylinder device is connected to a control chamber and operable upon an increase in pressure of fluid in said control chamber above a certain degree to another position in which said control chamber is cut off from said brake cylinder device and connected to said quick service reservoir and said quick service reservoir is cut off from atmosphere.

5. In a fluid pressure brake apparatus, in combination, a brake pipe, a brake cylinder device, a fluid pressure supply reservoir, a fluid pressure control reservoir, a brake controlling valve device operative upon a chosen reduction in brake pipe pressure relative to control reservoir pressure to supply fluid under pressure from said supply reservoir to said brake cylinder device, a quick service valve device controlled by opposing pressures of fluid in said brake pipe and said control reservoir operative upon a reduction in brake pipe pressure less than said chosen reduction relative to pressure of fluid in said control reservoir to establish a communication for effecting quick service venting of fluid under pressure from said brake pipe, and an inshot valve device controlling the quick service venting communication and also a communication through which fluid under pressure is supplied to said brake cylinder device and operative to close same in response to fluid pressure in said brake cylinder device exceeding a particular degree.

6. In a fluid pressure brake apparatus, in combination, a brake pipe, a brake cylinder device, a fluid pressure supply reservoir, a fluid pressure control reservoir, a brake controlling valve device operative upon a chosen reduction in brake pipe pressure relative to control reservoir pressure to supply fluid under pressure from said supply reservoir to said brake cylinder device, a quick service valve device controlled by opposing pressures of fluid in said brake pipe and said control reservoir operative upon a reduction in brake pipe pressure less than said chosen reduction relative to pressure of fluid in said control reservoir to establish a communication for effecting quick service venting of fluid under pressure from said brake pipe, and an inshot valve device controlling the quick service venting communication and also a communication through which fluid under pressure is supplied to said brake cylinder device and operative to close same in response to fluid pressure in said brake cylinder device exceeding a particular degree, and to open same in response to a reduction in pressure of fluid in the quick service reservoir below said particular degree.

7. In a fluid pressure brake apparatus, in combination, a brake pipe, a brake cylinder device, a supply reservoir, a control reservoir, a brake controlling valve device controlled by pressure of fluid in said brake pipe and an opposing control reservoir pressure and operative upon a chosen reduction in brake pipe pressure relative to said opposing pressure to supply fluid under pressure from said supply reservoir to said brake cylinder device, a quick service reservoir, a quick service valve device controlled by brake pipe pressure and opposing control reservoir pressure having a normal position connecting said quick service reservoir to atmosphere and operative in response to a reduction in brake pipe pressure less than said chosen reduction to cut off said atmospheric connection and to connect said brake pipe to said quick service reservoir, and an inshot valve device controlling a quick service venting communication from said reservoir to atmosphere and also a communication through which fluid under pressure is supplied to said brake cylinder device and operative to close same in response to fluid pressure in said brake cylinder device exceeding a particular degree.

8. In a fluid pressure brake apparatus, in combination, a brake pipe, a brake cylinder device, a supply reservoir, a control reservoir, a brake controlling valve device controlled by pressure of fluid in said brake pipe and an opposing control reservoir pressure and operative upon a chosen reduction in brake pipe pressure relative to said opposing pressure to supply fluid under pressure from said supply reservoir to said brake cylinder device, a quick service reservoir, a quick service valve device controlled by brake pipe pressure and opposing control reservoir pressure having a normal position connecting said quick service reservoir to atmosphere and operative in response to a reduction in brake pipe pressure less than said chosen reduction to cut off said atmospheric connection and to connect said brake pipe to said quick service reservoir, and an inshot valve device controlling a quick service venting communication from said reservoir to atmosphere and also a communication through which fluid under pressure is supplied to said brake cylinder device and operative to close same in response to fluid pressure in said brake cylinder device exceeding a particular degree and to open same in response to a reduction in pressure of fluid in the quick service reservoir below said particular degree.

9. In a fluid pressure brake apparatus, in combination, a brake pipe, a brake cylinder device, a supply reservoir, a control reservoir, a brake controlling valve device controlled by pressure of fluid in said brake pipe and an opposing control reservoir pressure and operative upon a chosen reduction in brake pipe pressure relative to said opposing pressure to supply fluid under pressure from said supply reservoir to said brake cylinder device, a quick service reservoir, a quick service valve device controlled by brake pipe pressure and opposing control reservoir pressure having a normal position for connecting said quick service reservoir to atmosphere and operative in response to a reduction in brake pipe pressure less than said chosen reduction to cut off said atmospheric connection and to connect said brake pipe to said quick service reservoir, and an inshot valve device having one position for effecting another connection of said quick service reservoir to atmosphere and for establishing a certain rate of flow of fluid under pressure from said brake controlling valve device to said brake cylinder device and operative in response to a certain degree of pressure of fluid in a control passage to another position for reducing the rate of flow of fluid under pressure from said brake controlling valve device to said brake cylinder device and closing said other connection of quick service reservoir to atmosphere and connecting said quick service reservoir to said control passage.

10. In a fluid pressure brake apparatus, in combination, a brake pipe, a control reservoir, a supply reservoir, a brake cylinder device, a brake controlling valve device operative by pressure of fluid in said control reservoir upon a chosen reduction in brake pipe pressure to supply fluid under pressure from said supply reservoir to said brake cylinder device for effecting an application of brakes and operative upon restoration of brake pipe pressure to release fluid under pressure from said brake cylinder device, and to supply fluid under pressure from said brake pipe to said reservoirs, said brake controlling valve device having a pressure chamber to which fluid under pressure may be supplied from said brake pipe and from which fluid under pressure may be supplied to said reservoirs, valve means operable by said brake controlling valve device upon a certain excess of pressure in said pressure chamber over control reservoir pressure to restrict the flow of fluid under pressure from said brake pipe to said pressure chamber according to the degree of said excess, and cut-off valve means interposed between said pressure chamber and said reservoirs operative by pressure of fluid in said control reservoir upon a certain reduction in brake pipe pressure less than said chosen reduction to cut off the supply of fluid under pressure from said pressure chamber to said reservoirs.

11. In a fluid pressure brake apparatus, in combination, a brake pipe, a control reservoir, a supply reservoir, a brake cylinder device, a brake controlling valve device operative by pressure of fluid in said control reservoir upon a chosen reduction in brake pipe pressure to supply fluid under pressure from said supply reservoir to said brake cylinder device for effecting an application of brakes and operative upon restoration of brake pipe pressure to release fluid under pressure from said brake cylinder device and to supply fluid under pressure from brake pipe to said reservoirs, said brake controlling valve device having a pressure chamber to which fluid under pressure may be supplied from said brake pipe and from which fluid under pressure may be supplied to said reservoirs, valve means operable by said brake controlling valve device upon a certain excess of pressure in said pressure chamber over control reservoir pressure to restrict the flow of fluid under pressure from said brake pipe to said pressure chamber according to the degree of said excess, cut-off valve means interposed between said pressure chamber and said reservoirs operative by pressure of fluid in said control reservoir upon a certain reduction in brake pipe pressure less than said chosen reduction to cut off the supply of fluid under pressure from said pressure chamber to said reservoirs, a relatively restricted conduit connecting said brake pipe to said control reservoir in by-passing relation to said brake controlling valve device and said cut-off valve means, and valve means operable by and in unison with said cut-off valve means to close off said conduit when said cut-off valve means operates to cut off such supply to said reservoirs.

12. In a fluid pressure brake apparatus, in combination, a brake pipe, a control reservoir, a supply reservoir, a brake cylinder device, a brake controlling valve device operative by pressure of fluid in said control reservoir upon a chosen reduction in brake pipe pressure to supply fluid under pressure from said supply reservoir to said brake cylinder device for effecting an application of brakes and operative upon restoration of brake pipe pressure to release fluid under pressure from said brake cylinder device to supply fluid under pressure from said brake pipe to said reservoirs, said brake controlling valve device having a pressure chamber to which fluid under pressure may be supplied from said brake pipe and from which fluid under pressure may be supplied to said reservoirs, valve means operable by said brake controlling valve device upon a certain excess of pressure in said pressure chamber over control reservoir pressure to restrict the flow of fluid under pressure from said brake pipe to said pressure chamber according to the degree of said excess, cut-off valve means interposed between said pressure chamber and said reservoirs operative by pressure of fluid in said control reservoir upon a certain reduction in brake pipe pressure less than said chosen reduction to cut off the supply of fluid under pressure from said pressure chamber to said reservoirs, a check valve interposed between said cut-off valve means and said control reservoir for preventing flow of fluid under pressure from said control reservoir to said brake pipe by way of said pressure chamber, a relatively restricted conduit connecting said brake pipe to said control reservoir in by-passing relationship to said brake controlling valve device and said cut-off valve means and said check valve, and valve means operable by and in unison with said cut-off valve means to close off said conduit when said cut-off valve means operates to cut off such supply to said reservoirs.

13. In a fluid pressure brake apparatus, in combination, a brake pipe, a control reservoir, a supply reservoir, a brake cylinder device, a brake controlling valve device operative by pressure of fluid in said control reservoir upon a chosen reduction in brake pipe pressure to supply fluid under pressure from said supply reservoir to said brake cylinder device for effecting an application of brakes and operative upon substantial restoration of brake pipe pressure to release fluid under pressure from said brake cylinder device and to supply fluid under pressure from said brake pipe to said reservoirs, said brake controlling valve device having a pressure chamber to which fluid under pressure may be supplied from said brake pipe and from which fluid under pressure may be supplied to said reservoirs, a quick service valve device controlled by opposing brake pipe pressure and control reservoir pressure operative in response to a certain reduction in brake pipe pressure less than said chosen reduction to establish a communication for effecting a quick service reduction in said brake pipe, and charging valve means interposed between said pressure chamber and said reservoirs operative by said quick service valve to cut off the supply of fluid under pressure from said pressure chamber to said reservoirs upon operation of said quick service valve to effect a quick service reduction.

14. In a fluid pressure brake apparatus, in combination, a brake pipe, a control reservoir, a supply reservoir, a brake cylinder device, a brake controlling valve device operative by pressure of fluid in said control reservoir upon a chosen reduction in brake pipe pressure to supply fluid under pressure from said supply reservoir to said brake cylinder device for effecting an application of brakes and operative upon substantial restoration of brake pipe pressure to release fluid under pressure from said brake cylinder device and to supply fluid under pressure from said brake pipe to said reservoirs, said brake controlling valve device having a pressure chamber to which fluid under pressure may be supplied from said brake pipe and from which fluid under pressure may be supplied to said reservoirs, a quick service valve device controlled by opposing brake pipe pressure and control reservoir pressure operative in response to a certain reduction in brake pipe pressure less than said chosen reduction to establish a communication for effecting a quick service reduction in said brake pipe, charging valve means interposed between said pressure chamber and said reservoirs operative by said quick service valve device to cut off the supply of fluid under pressure from said pressure chamber to said reservoirs upon operation of said quick service valve device to effect a quick service reduction, a relatively restricted conduit connecting said brake pipe to said control reservoir in by-passing relation to said brake controlling valve device and said charging valve means, and valve means operable by and with said charging valve means to close off said conduit when said supply to said reservoirs is cut off.

15. In a fluid pressure brake apparatus, in combination, a brake pipe, a brake cylinder device, a supply reservoir, a control reservoir, a brake controlling valve device controlled by pressure of fluid in said brake pipe and opposing control reservoir pressure and operative upon a chosen reduction in brake pipe pressure relative to said opposing pressure to supply fluid under pressure from said supply reservoir to said brake cylinder device, a quick service reservoir, a quick service valve device controlled by brake pipe pressure and opposing control reservoir pressure having a normal position for connecting said quick service reservoir to atmosphere and operative in response to a reduction in brake pipe pressure less than said chosen reduction to cut off said atmospheric connection and to connect said brake pipe to said quick service reservoir, and an inshot valve device having one position for establishing an inshot communication having a certain rate of flow of fluid under pressure from said brake controlling valve device to said brake cylinder device, for connecting said brake cylinder device to an inshot control passage and for effecting another connection of said quick service reservoir to atmosphere and operative in response to a certain degree of fluid pressure in said inshot control passage to another position to close same and connect said quick service reservoir to said inshot control passage, and a restricted communication means in by-passing relation to said inshot communication, said quick service valve device being operative upon substantial equalization of opposing pressures acting thereon to return to said normal position.

16. In a fluid pressure brake apparatus, in combination, a brake pipe, a control reservoir, a supply reservoir, brake applying means operable by fluid under pressure to effect application of brakes and upon release of fluid under pressure release of brakes, a control valve device operable by pressure of fluid in said control reservoir upon a reduction in pressure in a chamber to supply fluid under pressure from said supply reservoir to the fluid pressure operable means and by an increase in pressure in said chamber relative to pressure of fluid in said control reservoir to release fluid under pressure from said fluid pressure operable means, a one-way flow communication providing for flow of fluid under pressure from said chamber to said supply reservoir, said control device comprising a casing, two spaced-apart flexible diaphragms disposed in said casing in coaxial, connected relation with each other one of said diaphragms being subject to opposing fluid pressures of said control reservoir and said chamber and the other of said diaphragms being subject to pressure of fluid supplied to said brake applying means acting in the same direction as pressure in said chamber, a stem connecting said diaphragms to each other, valve means slidably mounted in a bore in said casing, and operably associated with said stem, a passageway in said casing connecting said brake pipe to said bore, said valve means controlling communication between said passageway and said chamber and operative by preponderance in force developed by pressures in said chamber and fluid pressure operable means acting on the respective diaphragms over that created by pressure of fluid in said control reservoir acting on the respective diaphragm to either throttle or close said communication between said passageway and chamber in accordance with the differential between the two opposing forces.

17. In a fluid pressure brake apparatus, in combination, a brake pipe, means operable by fluid under pressure to effect application of brakes, brake controlling means operable upon a reduction in brake pipe pressure to supply fluid under pressure to the fluid pressure operable means, two communications through which said fluid under pressure flows from said brake controlling means to said fluid pressure operable means, choke means in one of said communications, and an inshot valve device controlling the other of said two communications comprising an inshot valve disposed in a first chamber open to the portion of such communication connected to said brake controlling means and adapted to seat to close said first chamber from a second chamber open to the portion of such communication which is connected to said fluid pressure operable means, movable abutment means connected to said valve subject on one side to atmospheric pressure and on the opposite side to pressure of fluid in a third chamber, separate from said second chamber, and operative in response to a chosen pressure of fluid in said third chamber to effect closure of said valve, and a restricted passageway for conveying fluid under pressure from the last named portion of said other communication to said third chamber.

18. In a fluid pressure brake apparatus, in combination, a brake pipe, means operable by fluid under pressure to effect application of brakes, brake controlling means operable upon a reduction in brake pipe pressure to supply fluid under pressure to the fluid pressure operable means, two communications through which said fluid under pressure flows from said brake controlling means to said fluid pressure operable means, choke means in one of said communications, and an inshot valve device controlling the other of said two communications comprising an inshot valve disposed in a first chamber open to the portion of such communication connected to said brake controlling means and adapted to seat to close said first chamber from a second chamber open to the portion of such communication which is connected to said fluid pressure operable means, movable abutment means subject on one side to atmospheric pressure and on the opposite side to pressure of fluid in a third chamber, a stem slidably mounted in a bore in the casing extending through said third chamber and having one end connected to said movable abutment means and the other end disposed in said second chamber for engaging and unseating said valve, said movable abutment means being operative in response to a chosen pressure of fluid in said third chamber to move said stem away from said valve to effect seating of said valve, and a restricted passageway providing for flow of fluid under pressure from the last named portion of said other communication to said third chamber.

19. In a fluid pressure brake apparatus, in combination, a brake pipe, means operable by fluid under pressure to effect application of brakes, brake controlling means operable upon a reduction in brake pipe pressure to supply fluid under pressure to the fluid pressure operable means, two communications through which said fluid under pressure flows from said brake controlling means to said fluid pressure operable means, choke means in one of said communications, and an inshot valve device controlling the other of said two communications comprising an inshot valve disposed in a first chamber open to the portion of such communication connected to said brake controlling means and adapted to seat to close said first chamber from a second chamber open to the portion of such communication which is connected to said fluid pressure operable means, movable abutment means subject on one side to atmospheric pressure and having at the opposite side a valve normally closing communication between a third chamber encircling the seat for such valve and a fourth chamber within said seat and operative in response to a chosen pressure of fluid in said fourth chamber to unseat said valve, whereby pressure of fluid in said fourth chamber becomes effective in said third chamber to move said movable abutment means to a chosen position, means venting said third chamber with the last named valve seated and operative to close off such vent upon movement of said abutment means to said chosen position, means responsive to movement of said abutment means to said chosen position to seat said inshot valve, and a restricted communication connecting said fourth chamber to the last named portion of said other communication.

20. In a fluid pressure brake apparatus, in combination, a brake pipe, means operable by fluid under pressure to effect application of brakes, brake controlling means operable upon a reduction in brake pipe pressure to supply fluid under pressure to the fluid pressure operable means, two communications through which said fluid under pressure flows from said brake controlling means to said fluid pressure operable means, choke means in one of said communications, and an inshot valve device controlling the other of said two communications comprising an inshot valve disposed in a first chamber open to the portion of such communication connected to said brake controlling means and adapted to seat to close said first chamber from a second chamber open to the portion of such communication which is connected to said fluid pressure operable means, a flexible diaphragm subject on one side to atmospheric pressure and at the opposite side to pressure of fluid in a third chamber, a normally seated disc-like valve loosely associated with the opposite side of said diaphragm controlling communication between said third chamber which encircles the seat for such valve and a fourth chamber encircled by said seat, and unseatable by a chosen pressure of fluid in said fourth chamber to open said fourth chamber to said third chamber whereby pressure of fluid becomes effective over the full area of said opposite side of said diaphragm to deflect same to a chosen position, valve means normally venting said third chamber and operative by movement of said diaphragm to said chosen position to close such vent, means responsive to deflection of said diaphragm to said chosen position to close said inshot valve, and a restricted communication connecting said fourth chamber to the last named portion of said other communication.

21. In a fluid pressure brake apparatus, in combination, a brake pipe, means operable by fluid under pressure to effect application of brakes, brake controlling means operable upon a reduction in brake pipe pressure to supply fluid under pressure to the fluid pressure operable means, two communications through which said fluid under pressure flows from said brake controlling means to said fluid pressure operable means, choke means in one of said communications, and an inshot valve device controlling the other of said two communications comprising an inshot valve disposed in a first chamber open to the portion of such communication connected to said brake controlling means and adapted to seat to close said first chamber from a second chamber open to the portion of such communication which is connected to said fluid pressure operable means, a flexible diaphragm subject on one side to atmospheric pressure and at the opposite side to pressure of fluid in a third chamber, a normally seated disc-like valve loosely associated with the opposite side of said diaphragm controlling communication between said third chamber which encircles the seat for such valve and a fourth chamber encircled by said seat, and unseatable by a chosen pressure of fluid in said fourth chamber to open said fourth chamber to said third chamber whereby pressure of fluid becomes effective over the full area of said opposite side of said diaphragm to deflect same to a chosen position, a stem connected to said diaphragm and movable therewith in a bore, a passageway in said stem constantly open at one end to said third chamber and at the opposite end to atmospheric pressure at said one side of said diaphragm with said disc valve seated and closed by the wall of said bore upon deflection of said diaphragm to said chosen position, means responsive to deflection of said diaphragm to said chosen position to close said inshot valve, and a restricted communication connecting said fourth chamber to the last named portion of said other communication.

22. In a fluid pressure brake apparatus, in combination, a brake pipe, means operable by fluid under pressure to effect application of brakes, a control reservoir, a supply reservoir, a brake controlling valve device operable in response to a chosen reduction in pressure in said brake pipe below that in said control reservoir to supply fluid under pressure from said supply reservoir to the fluid pressure operable means, quick service means controlled by pressure of fluid in said brake pipe and an opposing pressure operative, upon less than said chosen reduction in brake pipe pressure, to establish, independent of said brake controlling valve device, a quick service communication with said brake pipe through which quick service venting of fluid under pressure from said brake pipe is effected, and an inshot valve device controlling said communication and also one of two other communications through which fluid under pressure flows from said brake controlling valve device to said fluid pressure operable means and operable in response to a chosen pressure of fluid supplied by said brake controlling valve device to said fluid pressure operable means to close both of the communications controlled thereby.

23. In a fluid pressure brake apparatus, in combination, a brake pipe, means operable by fluid under pressure to effect application of brakes, a control reservoir, a supply reservoir, a brake controlling valve device operable in response to a chosen reduction in pressure in said brake pipe below that in said control reservoir to supply fluid under pressure from said supply reservoir to the fluid pressure operable means, quick service means controlled by pressure of fluid in said brake pipe and an opposing pressure operative, upon less than said chosen reduction in brake pipe pressure, to establish, independent of said brake controlling valve device, a quick service communication with said brake pipe through which quick service venting of fluid under pressure from said brake pipe is effected, two communications through which fluid under pressure flows from said supply reservoir to said fluid pressure operable means upon said operation of said brake controlling valve device; a choke in one of said two communications, inshot valve means normally opening the other of said two communications and said quick service communication, and operative to close both of such communications in response to a chosen pressure of fluid in a chamber, and a choked communication opening said chamber to the other of said two communications at fluid pressure operable means side of said inshot valve means.

24. In a fluid pressure brake apparatus, in combination, a brake pipe, a control reservoir, a supply reservoir, means operable by fluid under pressure to effect application of brakes and upon release of fluid under pressure release of brakes, a control valve device operable by pressure of fluid in said control reservoir upon a reduction in pressure in a chamber to supply fluid under pressure from said supply reservoir to the fluid pressure operable means and by a chosen increase in pressure in said chamber relative to pressure of fluid in said control reservoir to release fluid under pressure from said fluid pressure operable means, said control device comprising a casing, two spaced-apart flexible diaphragms disposed in said casing in coaxial, connected relation with each other, one of said diaphragms being subject to opposing fluid pressures of said control reservoir and said chamber and the other of said diaphragms being subject to pressure of fluid supplied to said brake applying means acting in the same direction as pressure in said chamber, a stem connecting said diaphragms to each other, valve means slidably mounted in a bore in said casing, operably associated with said stem and a passageway in said casing connecting said brake pipe to said bore, said valve means controlling communication between said passageway and said chamber and operative by preponderance in force developed by pressure in said chamber and fluid pressure operable means acting on the respective diaphragms over that created by pressure of fluid in said control reservoir acting on the respective diaphragm to either throttle or close said communication between said passageway and chamber in accordance with the differential between the two opposing forces, a communication including a choke connecting said chamber to said supply reservoir, a check valve in the last named communication seatable by pressure of fluid in the supply reservoir to prevent flow of fluid under pressure through the last named communication from said supply reservoir to said chamber and unseatable by a preponderance in pressure in said chamber over that in said supply reservoir to provide for flow of fluid under pressure in the reverse direction from said chamber to said supply reservoir for charging said supply reservoir, and means for preventing unseating of said check valve by a differential between the pressures in said supply reservoir and chamber a chosen degree in excess of that between the pressures in said chamber and control reservoir at which said control valve device operates to release fluid under pressure from said fluid pressure operable means.

25. In a fluid pressure brake apparatus, in combination, a brake pipe, a control reservoir, a supply reservoir, a brake cylinder device, a brake controlling valve device operative by pressure of fluid in said control reservoir upon a chosen reduction in brake pipe pressure to supply fluid under pressure from said supply reservoir to said brake cylinder device for effecting an application of brakes and operative upon restoration of brake pipe pressure to release fluid under pressure from said brake cylinder device, said brake controlling valve device comprising a movable abutment subject at one side to control reservoir pressure and having at the opposite side a pressure chamber via which fluid under pressure may be supplied to said reservoirs, and piston valve means slidably mounted in a bore and positively connected to said movable abutment at said one side thereof, said piston valve means controlling a communication between said brake pipe and pressure chamber, said communicaton including a sideport flow connection intersecting the wall of the bore and further including a generally axial opening through said piston valve means and movable abutment, said piston valve means being operable by said movable abutment upon a certain excess of pressure in said pressure chamber over control reservoir pressure to close the sideport flow connection according to the degree of said excess to correspondingly restrict the flow of fluid under pressure from said brake pipe to said pressure chamber.

26. A fluid pressure brake apparatus comprising, in combination, a normally charged brake pipe, a brake cylinder, a supply reservoir, quick service valve means responsive to an initial slight reduction in brake pipe pressure below normal charge value to open the brake pipe to a quick service communication for effecting a local quick service reduction in brake pipe pressure and responsive to a subsequent increase in brake pipe pressure to close off the brake pipe from said quick service communication and connect the latter to atmosphere, a brake controlling valve device normally venting the brake cylinder and responsive to a chosen reduction in brake pipe pressure, greater than said slight reduction, below normal charge value to supply fluid under pressure from said supply reservoir to a brake cylinder supply communication, flow-restricting means interposed between the brake cylinder supply communication and brake cylinder, an inshot valve device comprising an inshot valve normally open for opening the brake cylinder supply communication to the brake cylinder in by-pass of said flow-restricting means, a second valve normally closed for preventing flow between a first chamber and a second chamber, other valve means normally opening said first chamber to the brake cylinder while also opening said second chamber and quick service communication to atmosphere, and a movable abutment subject to pressure of fluid in said second chamber opposing a spring bias and normally biased by said spring bias to one position for operatively causing said inshot valve, second valve and other valve means to assume their above defined normal positions, said second valve being responsive to a brake cylinder pressure in excess of a chosen value to open said first chamber to said second chamber for thereby causing said movable abutment to promptly move to another position for permitting closure of said inshot valve and causing operation of said other valve means to disconnect said second chamber and said quick service communication from atmosphere and disconnect said brake cylinder from said first chamber and open the latter to said quick service communication, whereby fluid under pressure will be bottled up in said quick service communication and cause said movable abutment to be maintained in its said other position until after said quick service valve means has operated to connect the quick service communication to atmosphere.

References Cited in the file of this patent

UNITED STATES PATENTS

| | | |
|---|---|---|
| 1,819,505 | Farmer | Aug. 18, 1931 |
| 2,014,890 | Good | Sept. 17, 1935 |
| 2,032,154 | Simmons | Feb. 25, 1936 |
| 2,084,695 | McClure et al. | Jan. 22, 1937 |
| 2,276,927 | Christen | Mar. 17, 1942 |
| 2,376,680 | Gallusser | May 22, 1945 |
| 2,629,638 | Snyder | Feb. 24, 1953 |